United States Patent [19]

Aftergut et al.

[11] 4,350,603
[45] Sep. 21, 1982

[54] NOVEL TRIS-AZO DYES AND LIQUID CRYSTAL COMPOSITIONS MADE THEREWITH

[75] Inventors: Siegfried Aftergut, Schenectady; Herbert S. Cole, Jr., Scotia, both of N.Y.

[73] Assignee: General Electric Company, Schenectady, N.Y.

[21] Appl. No.: 164,254

[22] Filed: Jun. 30, 1980

[51] Int. Cl.$^3$ .................. G02F 1/13; C09K 3/34; C09B 31/16; C09B 35/36; C09B 33/22

[52] U.S. Cl. .................. 252/299.1; 350/349; 260/169; 260/173

[58] Field of Search .................. 252/299.1; 260/169, 260/173

[56] References Cited

U.S. PATENT DOCUMENTS

| | | | |
|---|---|---|---|
| 4,116,861 | 9/1978 | Aftergut et al. | 252/299.1 |
| 4,122,027 | 10/1978 | Cole, Jr. et al. | 252/299.1 |
| 4,128,496 | 12/1978 | Cole, Jr. et al. | 252/299.1 |
| 4,128,497 | 12/1978 | Cole, Jr. et al. | 252/299.1 |
| 4,137,193 | 1/1979 | Osmam | 252/299.1 |
| 4,141,627 | 2/1979 | Bloom et al. | 252/299.1 |
| 4,145,114 | 3/1979 | Coates et al. | 252/299.1 |
| 4,153,343 | 5/1979 | Bloom et al. | 252/299.1 |

OTHER PUBLICATIONS

Cox, R. J.; Mol. Cryst. Liq. Cryst., vol. 55, pp. 1–32 (1979).

Bloom, A., et al.; Mol. Cryst. Liq. Cryst. (Lett.), vol. 41, pp. 1–4 (1977).

Bloom, A., et al.; Mol. Cryst. Liq. Cryst., vol. 40, pp. 213–221 (1977).

White, D. L., et al., J. Appl. Phys., vol. 45, No. 11, pp. 4718–4723 (1974).

*Primary Examiner*—Teddy S. Gron
*Attorney, Agent, or Firm*—William A. Teoli; James C. Davis, Jr.

[57] ABSTRACT

Novel tris-azo dye compositions and a liquid crystal composition containing the tris-azo dye compositions are disclosed. The tris-azo dye composition having terminal aromatic groups has the general formula:

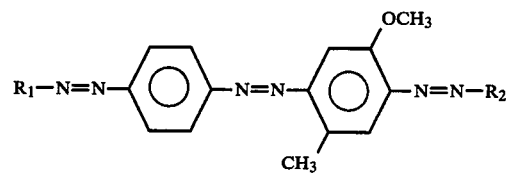

wherein $R_1$ and $R_2$ are various aromatic compounds including aromatic amines, substituted aromatic amines, hydroxy-substituted aromatic compounds and substituted hydroxy-containing aromatic compounds. When the tris-azo dichroic dyes are used as a guest dye in a host liquid crystal material, they form a novel liquid crystal composition for use in liquid crystal displays. Examples of $R_1$ and $R_2$ include organic radicals of aminoquinoline, tetrahydroquinoline, N-ethyl-1-naphthylamine and 1,8-diaminonaphthalene.

10 Claims, No Drawings

NOVEL TRIS-AZO DYES AND LIQUID CRYSTAL COMPOSITIONS MADE THEREWITH

This invention relates to liquid crystal compositions, and more particularly, to tris-azo dye compounds and to dichroic liquid crystal compositions containing the tris-azo dyes.

Dyes having improved properties are desirable for various applications, including the dyeing of textiles, the coloring of plastics and the coloring of liquid crystal displays. Among those properties which are desirable for dyes, especially for dyes used in liquid crystal displays, are photostability of the dye, suitable extinction coefficient of the dye, solubility of the dye in liquid crystal hosts, orientability of the dye in liquid crystal hosts and light absorption in the desired spectral region. In liquid crystal displays, certain colors of dyes are especially useful for modifying the color of other dyes or as additives for black dichroic dye formulations, and the like. Thus, it is particularly important to provide dyes which have maximum light absorption at certain wavelengths in order to modify appropriately a color of a dye or as an additive for black dichroic dye formulations, especially those to be used in liquid crystal displays. To obtain the desired light absorption at a particular wavelength, or to obtain maximum absorption at a particular wavelength, it is often desirable to modify dye molecules so that there is maximum absorption of light radiation at a particular wavelength or at a number of wavelengths, e.g., black dichroic dyes for liquid crystal displays. To shift the wavelength, various groups may be incorporated upon particular dye molecules to cause a bathochromic shift in the light absorption to achieve the desired light absorption. All of this is preferably accomplished without adding substituents which affect the solubility of the dye, especially the solubility of the dye in a liquid crystal formulation, and without significant impact upon other desirable properties of the dyes used in liquid crystal displays.

The fabrication of black liquid crystal displays poses a particular problem in that no black dichroic dyes are known, and black liquid crystal displays are made by mixing dichroic dyes of various colors in proper proportions to obtain a material which absorbs light radiation in the spectral range of about 400–700 nm resulting substantially in a black color. Thus, a bathochromic shift in a particular dye or dyes can improve the absorption in light radiation in the appropriate spectral range to improve the black color by shifting the wavelength of maximum absorption to a longer wavelength. The bathochromic shift can result in a more saturated color, and when intensity and greater contrast are required, it is desirable to achieve a bathochromic shift which will result in a more saturated color. In the case of the black dichroic formulations for liquid crystal displays, it is desirable to provide more saturated blue colors. Thus, for the black formulations, the bathochromic shift is important at the 600 nm end of the spectrum because there are few suitable dichroic dyes having a maximum absorption above 600 nm which are soluble in liquid crystal host materials, and have other desirable properties for use in formulations used for liquid crystal displays. Many of the prior art dyes, e.g., the ionic dyes, having a maximum absorption of light radiation above 600 nm are insoluble in liquid crystal formulations and cannot be used to color such displays.

Dichroic dyes having three azo (—N=N—) bonding groups and having suitable order parameters, S, greater than 0.70 are disclosed in U.S. Pat. No. 4,122,027. The high order parameter dichroic dyes in U.S. Pat. No. 4,122,027 are 4,4'-bis-(substituted naphthylazo) azobenzenes having a generic chemical formula as follows:

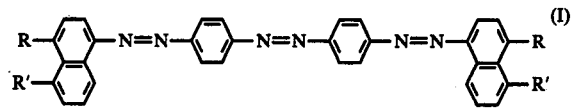

wherein R and R' are selected from (among others) the following substituents:

| Dye | R | R' | S | λMax. (Approx.) | Color |
|---|---|---|---|---|---|
| 1 | N(CH₃)₂ | H | 0.74 | 555 | Violet |
| 2 | NHCH₃ | H | 0.75 | 595 | Blue |
| 3 | NHC₂H₅ | H | 0.72 | 598 | Blue |
| 4 | NH₂ | H | 0.74 | 580 | Purple |
| 5 | NH₂ | NH₂ | 0.74 | 595 | Blue |

The order parameters, maximum attenuation wavelength (λMax.) and color are shown for each of the respective dyes of prior art formula (I) illustrated above. Although the foregoing dyes of U.S. Pat. No. 4,122,027 are suitable for coloring liquid crystal mixtures and have adequate properties, e.g., solubility, for use in liquid crystal displays, it is always desirable to improve those properties and to provide azo dyes having more intense or saturated colors especially at wavelengths over 600 nm.

Dichroic liquid crystal mixtures, each having a liquid crystal material and at least one dichroic dye dissolved therein, the dichroic dye having a plurality of azo (—N=N—) bonding groups and characterized by an order parameter, S, greater than 0.65 and by a maximum absorption wavelength in the range of about 495 nm to about 620 nm, are disclosed in U.S. Pat. No. 4,128,497. Tris-azo dichroic dyes dissolved in liquid crystal material in U.S. Pat. No. 4,128,497 include those having the following general chemical formula:

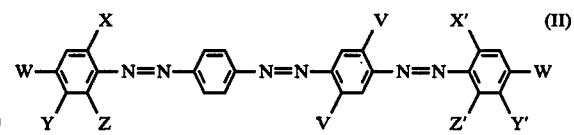

wherein V, W, X, Y, Z, X', Y', and Z', can be selected from various substituents including various combinations of hydrogen, —CH₃, —N(CH₃)₂, (C₂H₅)₂N—, —OH, and the like as disclosed in U.S. Pat. No. 4,128,497. In the foregoing prior art formula (II), Y' and Z' and Y and Z can form a benzene ring structure with the respective ring to which they are attached and thereby form a naphthyl end or terminal group on one end or both ends of the trisazo dye. Although the dyes of U.S. Pat. No. 4,128,497 can be dissolved in liquid crystal compositions to form liquid crystal displays of suitable colors, it is always desirable to improve the colors of dichroic dyes used in liquid crystal compositions, especially to provide dyes, the absorption band of which lies at longer wavelengths due to the shift of the wavelength region and thereby provide more saturated colors, especially more saturated blue colors, without sacrifice of the solubility of the dye in the liquid crystal, and preferably increasing the solubility of the dye in the liquid crystal composition.

Other dye compounds suitable for use in solution with a liquid crystal material and containing azo linkages, including the tris-azo dyes, are well-known in the prior art. In U.S. Pat. No. 4,145,114, a substantial number of dye compounds are proposed for use in liquid crystal materials. The classes of azo or azoxy dyes in U.S. Pat. No. 4,145,114 have the following general formula:

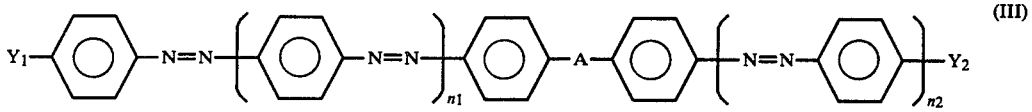

or a substituted derivative of the foregoing formula in which any one of the positions on any one of the benzene rings is substituted by halogen, methyl, halogen-substituted methyl, or methoxy; wherein A is an azo or azoxy linkage group; $n_1$ and $n_2$ are each integers in the inclusive range 0 to 4; and $Y_1$ and $Y_2$ are each one of the following groups: (i) hydrogen; (ii) OR wherein R is an alkyl or arylalkyl group; or a group having the following formula:

where $R_2$ and $R_1$ are each one of the following: an alkyl group, a substituted alkyl group or an alkylene group forming a reduced heteroaromatic system with the terminal aromatic ring. Although pleochroic dyes of the above prior art formulas (III) and (IV) are proposed in U.S. Pat. No. 4,145,114, there is no evidence therein that any unusual properties of a segment of the dyes covered by said prior art general formulas (III) and (IV) were uncovered or suggested with respect to the tris-azo dyes having methyl and methoxy substituents in the 2- and 5-positions upon one of the benzene rings adjacent the "A" joining two benzene rings in prior art formula (III) above, even though U.S. Pat. No. 4,145,114 discloses that any one of the positions on any one of the benzene rings in prior art formula (III) above may be substituted by a methyl or a methoxy group. Although numerous pleochroic dyes are proposed in U.S. Pat. No. 4,145,114, it is always desirable to improve azo dyes and to improve liquid crystal displays containing azo dyes. To that end, it is desirable to select specific characteristics, compositions and conditions within such broadly proposed fields of the prior art to improve thereon, and specifically, to improve classes of azo dyes and to improve liquid crystal displays containing such classes of azo dyes.

Accordingly, it is the primary object of the present invention to provide tris-azo dyes having a novel chemical composition.

It is another object of the present invention to provide novel liquid crystal compositions for use in liquid crystal displays.

Another object of the present invention is to provide tris-azo dyes having improved properties without sacrificing the solubility of the dyes in liquid crystals.

Another object of the present invention is to provide improved dichroic liquid crystal displays made by mixing dichroic dyes having more saturation at longer wavelengths and improved solubility in the liquid crystal composition.

Yet another object of the present invention is to provide dichroic dyes which tend to have a bathochromic shift with respect to the tris-azo dyes of the prior art.

Still another object of the present invention is to provide a class of tris-azo dyes, the absorption band of which lies at longer wavelengths because the shift in that wavelength region yields more saturated blue colors.

Another object of this invention is to provide improved black dichroic liquid crystal displays made by mixing dichroic dyes of various colors and to provide a method of improving the black color of dichroic dyes used in black liquid crystal displays.

Other objects and advantages of the invention will become apparent as the description thereof proceeds.

These and other objects of the invention are achieved by providing tris-azo dyes having the general formula:

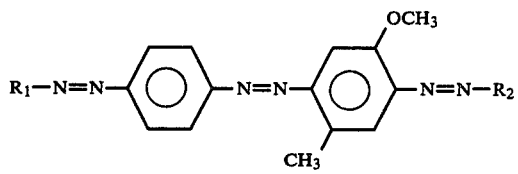

wherein $R_1$ and $R_2$ are selected from the group consisting of:
(I) aminoquinoline:

(II) tetrahydroquinoline:

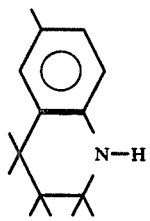

(III) aromatic amines and substituted aromatic amines having the formula:

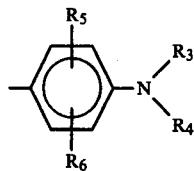

wherein $R_3$ is an alkyl group having from about 1 to 6 carbon atoms, aryl, arylalkyl, or alkyl amine wherein the alkyl is about 1 to 6 carbon atoms or hydrogen; $R_4$ is an alkyl group having from about 1 to 6 carbon atoms, alkyl amine wherein the alkyl is about 1 to 6 carbon atoms, or hydrogen; $R_5$ is an alkyl having from about 1 to 3 carbon atoms, alkoxy, halogen, or hydrogen; and $R_6$ is an alkyl group having from about 1 to 3 carbon atoms hydroxy, alkoxy, halogen or hydrogen;

(IV) aromatic amines and substituted aromatic amines having the formula:

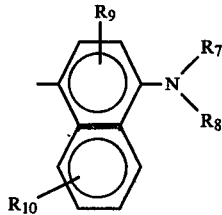

wherein $R_7$ is hydrogen, an alkyl group having from about 1 to 6 carbon atoms, aryl, arylalkyl or alkyl amine wherein the alkyl is about 1 to 6 carbon atoms and aryl is phenyl or naphthyl; $R_8$ is hydrogen, an alkyl group having from about 1 to 6 carbon atoms, or alkyl amine wherein the alkyl is from about 1 to 6 carbon atoms; and $R_9$ is hydrogen; alkyl having from about 1 to 3 carbon atoms, alkoxy or halogen; and $R_{10}$ is hydrogen; alkyl having from about 1 to 3 carbon atoms, alkoxy or halogen;

(V) substituted benzene having the formula:

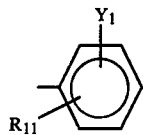

wherein $Y_1$ is hydroxy; or N-containing cyclic groups selected from the group consisting of piperidine; piperazine; 3,5-dimethyl-pyrazole; and carbazole, the piperidine, piperazine, 3,5-dimethyl-pyrazole and carbazole being bonded to the aryl group through the N atom in the cyclic molecule; and $R_{11}$ is an alkyl group having from 1 to 3 carbon atoms, hydrogen, halogen, alkoxy, or alkyl amine wherein the alkyl group is about 1 to 6 carbon atoms;

(VI) substituted naphthalene having the formula:

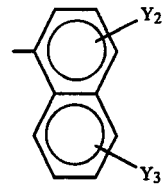

wherein $Y_2$ is hydroxy or amino (—$NH_2$), and $Y_3$ is hydrogen, amino (—$NH_2$), hydroxy, alkoxy, alkyl having about 1 to 3 carbon atoms or alkyl amine wherein the alkyl is about 1 to 6 carbon atoms; and, (VII) julolidene:

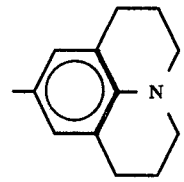

The foregoing terminal groups are illustrated in the form of the organic radical, and the terminal group links to or joins the azo group at the bond generally shown in the para position of the terminal group.

The foregoing dyes have three azo (—N=N—) linking groups, one of the azo linking groups joining an unsubstituted benzene ring and a benzene ring having a methyl group substituted in the 2-position and a methoxy group substituted in the 5-position of the benzene ring. The other two azo groups join the unsubstituted and the methyl-and methoxy-substituted benzene ring at the para position to a third and fourth substituent, designated as $R_1$ and $R_2$ respectively, in the general formula of the dye. The third and fourth substituents joined to the second and third azo groups are substituted aromatic or aryl compounds, e.g., naphthalene, or one of the third and fourth substituents is hydrogen and the other substituent is substituted aromatic or aryl compound. The substituted aromatic or aryl terminal groups (designated by $R_1$ and $R_2$ in the general dye formula), are auxochromes, i.e., electron-withdrawing groups or electron-repelling groups. The terminal groups of the class of dyes discovered herein generally produce a bathochromic shift when they are present upon the dye molecule having the methyl group substituted at the 2-position and the methoxy group substituted at the 5-position of the benzene ring as shown in the general formula for the dyes of this invention. This bathochromic shift is particularly important for dyes, the absorption band of which lies at longer wavelengths, for example, those wavelengths approaching 590 nm and above, because the shift in that wavelength region yields more saturated blue colors. For example, many of the dyes of the present invention have peak absorption ($\nu$Max.) greater than 600 nm, and many of the preferred dyes have peak absorption as high as 615 nm or higher. Furthermore, the tris-azo dyes of the present invention having substituted aromatic groups as terminal end groups upon the joining or connecting azo groups tend to be more soluble because of the methyl group substituted in the 2-position and the methoxy group substituted in the 5-position upon the benzene ring as shown above in the general formula of the dyes of the present invention.

In accordance with the present invention, there is also provided a liquid crystal composition for use in a liquid crystal display, comprising, a host liquid crystal material; and a guest dye dissolved in the host liquid crystal material, the dye having the general formula and the preferred substituted aromatic groups, namely, substituted benzene and substituted naphthalene, as discussed above. The unique and novel class of tris-azo dyes (dyes having three azo groups) of the present invention must have the methyl group substituted in the 2-position and the methoxy group substituted in the 5-position of a benzene ring adjacent to the central or intermediate azo group of the dye molecule and at least one substituted aromatic group upon a terminal azo group in the tris-azo dye. In preferred embodiments, both terminal groups are substituted aromatic groups, however, one terminal group may be hydrogen and the other terminal group may be a substituted aromatic group. It is the synergism between the methyl group substituted in the 2-position and the methoxy group substituted in the 5-position in the benzene ring adjacent the center azo group and the terminal substituted aromatic group or groups which result in the improved tris-azo dyes of the present invention and the improved liquid crystal composition for use in a liquid crystal display comprising a host liquid material and the improved guest dichroic dyes of the present invention.

These and various other objects, features and advantages of the invention can be best understood from the following detailed description.

The tris-azo dyes or guest dichroic tris-azo dyes of the present invention have been synthesized by a reaction mechanism which produces the following general formula representing the class of tris-azo dyes:

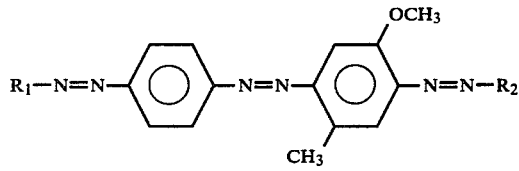

The dye molecule has a relatively elongated and rigid molecular structure. Many of the dyes prepared by the reaction mechanism of this invention and having the foregoing general formula are particularly useful in those areas where the absorption band lies at longer wavelengths because of the bathochromic shift in that wavelength region which yields more saturated blue colors. The $R_1$ and $R_2$ in the general formula for the tris-azo dyes and guest dichroic tris-azo dyes, represent substituted aromatic groups which are linked or joined to the basic dye structure or molecule by azo linkages or bonds. In accordance with preferred embodiments of the present invention, $R_1=R_2$. However, it is within the scope of the present invention to provide dyes of the general formula wherein $R_1$ and $R_2$ comprise different substituted aromatic groups, and in fact $R_1$ and $R_2$ may represent any combination of the substituted aromatic or aryl groups of the present invention including substituted benzene groups and substituted naphthalene groups.

The substituted aromatic or aryl groups of the present invention represented by $R_1$ and $R_2$ in the general formula, are any one of several of the following substituted aromatic groups:

(I) aminoquinoline

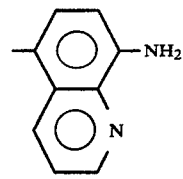

The preferred amino-substituted quinoline is 8-aminoquinoline. When $R_1$ and/or $R_2$ are amino-substituted quinoline, the tris-azo dye or the guest dichroic tris-azo dye is one of the preferred dyes of the present invention.

(II) tetrahydroquinoline

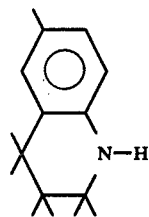

In accordance with the present invention, one of the preferred embodiments is the tris-azo dye wherein $R_1$ and/or $R_2$ is tetrahydroquinoline.

(III) aromatic amines and substituted aromatic amines, such as, aminated benzene or aminated substituted-benzene having the formula:

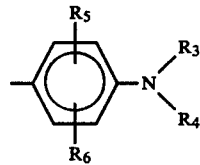

wherein $R_3$ and $R_4$ are alkyl groups having from 1 to 6 carbon atoms or hydrogen and $R_5$ and $R_6$ are alkyl groups having from 1 to 3 carbon atoms or hydrogen. In a preferred class of tris-azo dye or guest dichroic tris-azo dyes of Group (III), $R_3$ is hydrogen, aryl, arylalkyl or alkyl amine wherein the alkyl is about 1 to 6 carbon atoms and aryl is phenyl or naphthyl; $R_4$ is hydrogen, alkyl having from about 1 to 6 carbon atoms or alkyl amine wherein the alkyl is about 1 to 6 carbon atoms; $R_5$ is hydrogen, alkyl having from about 1 to 3 carbon atoms, alkoxy or halogen; and $R_6$ is hydrogen, alkyl having from about 1 to 3 carbon atoms, hydroxy (—OH), alkoxy or halogen.

(IV) aromatic amines and substituted aromatic amines, such as, aminated naphthalene or aminated substituted naphthalene having the formula:

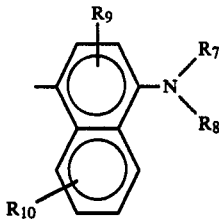

wherein R₇ is hydrogen or an alkyl group having from 1 to 6 carbon atoms, and R₈ is an alkyl group having from 1 to 6 carbon atoms, aryl, arylalkyl, or alkyl amine wherein the alkyl is from 1 to 6 carbon atoms and aryl is phenyl or naphthyl; and R₉ and R₁₀ are hydrogen. In more preferred embodiments, the aminated naphthalene or the aminated substituted naphthalene embraces groups wherein R₇ is hydrogen, aryl, arylalkyl or alkyl amine wherein the alkyl is about 1 to 6 carbon atoms, and the aryl is phenyl or naphthyl; R₈ is hydrogen, alkyl having from about 1 to 6 carbon atoms or alkyl amine wherein the alkyl is about 1 to 6 carbon atoms; R₉ is hydrogen, alkyl having from about 1 to 3 carbon atoms, alkoxy or halogen; and R₁₀ is hydrogen, alkyl having from about 1 to 3 carbon atoms, alkoxy or halogen.

(V) substituted benzene having the formula:

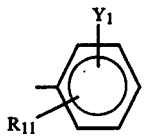

wherein Y₁ is hydroxy; or N-containing cyclic groups selected from the group consisting of piperidine; piperazine; 3,5-dimethyl-pyrazole and carbazole; the piperidine, piperazine, 3,5-dimethyl-pyrazole and carbazole being bonded to the aryl group through the N atom in the cyclic molecule; and R₁₁ is an alkyl group having from 1 to 3 carbon atoms or hydrogen. In other embodiments, R₁₁ may be an alkyl group having from about 1 to 3 carbon atoms, alkyl amine wherein the alkyl is about 1 to 6 carbon atoms, alkoxy, halogen or alkyl-substituted amine.

(VI) substituted naphthalene having the formula:

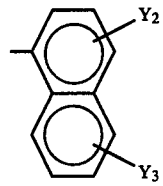

wherein Y₂ is hydroxyl or amino, and Y₃ is hydrogen or amino. In other embodiments, Y₃ may be alkoxy, alkyl or alkylamine wherein the alkyl is about 1 to 6 carbon atoms. As used herein, alkoxy may have from about 1 to 6 carbon atoms, but in preferred embodiments, alkoxy is methoxy and ethoxy.

The dyes of the present invention may be synthesized in any suitable manner. In one preferred method of synthesis, 4,4'-diamino-2-methyl-5-methoxyazobenzene is diazotized or tetrazotized. In those cases where only one terminal group comprising the aromatic or aryl group is desired or where two terminal groups comprising different aromatic groups are desired, the 4,4'-diamino-2-methyl-5-methoxyazobenzene is diazotized, or if both terminal groups comprise the same substituted aromatic or substituted aryl group then the 4,4'-diamino-2-methyl-5-methoxyazobenzene is tetrazotized. The diazotization or tetrazotization is carried out in the conventional manner, for example, using sodium nitrite and dilute hydrochloric acid. The product formed from the diazotization or tetrazotization is the diazonium or tetrazonium salt respectively. The diazonium salt or tetrazonium salt is reacted with the appropriate aromatic amine, phenol, naphthol and the like to yield the trisazo dyes of the present invention. If a triazo dye having two different terminal groups is desired, the reaction product of the diazonium salt and the appropriate aromatic amine, phenol, naphthol and the like, is again diazotized to form a diazonium salt which is, in turn, reacted with a second aromatic amine, phenol, naphthol and the like, different from the first aromatic amine, phenol, naphthol and the like.

In general, the synthesis of the dyes of the general formula is carried out by diazotizing or tetrazotizing 4,4'-diamino-2-methyl-5-methoxyazobenzene to form a diazonium or tetrazonium salt and thereafter coupling the respective diazonium or tetrazonium salt with the appropriate aromatic amine. The substituted aromatic compound couples to the diazonium or tetrazonium salt in the para position (relative to the substituted group on the aromatic compound). In those cases where the desired terminal group or terminal groups upon the dye molecule are phenol, substituted phenol, naphthol or substituted naphthol, and the like, the appropriate hydroxy-substituted aromatic compound or compounds are coupled with the diazonium or tetrazonium salt as produced above. Where the desired terminal group or terminal groups are aromatic amines, the appropriate substituted benzenes or substituted naphthalenes are coupled with the diazonium or tetrazonium salt. As explained above, various combinations of the foregoing may also be used in accordance with the present invention. The general synthesis is shown below using N-ethyl-1-naphthylamine as the coupling agent:

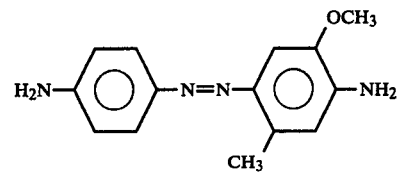

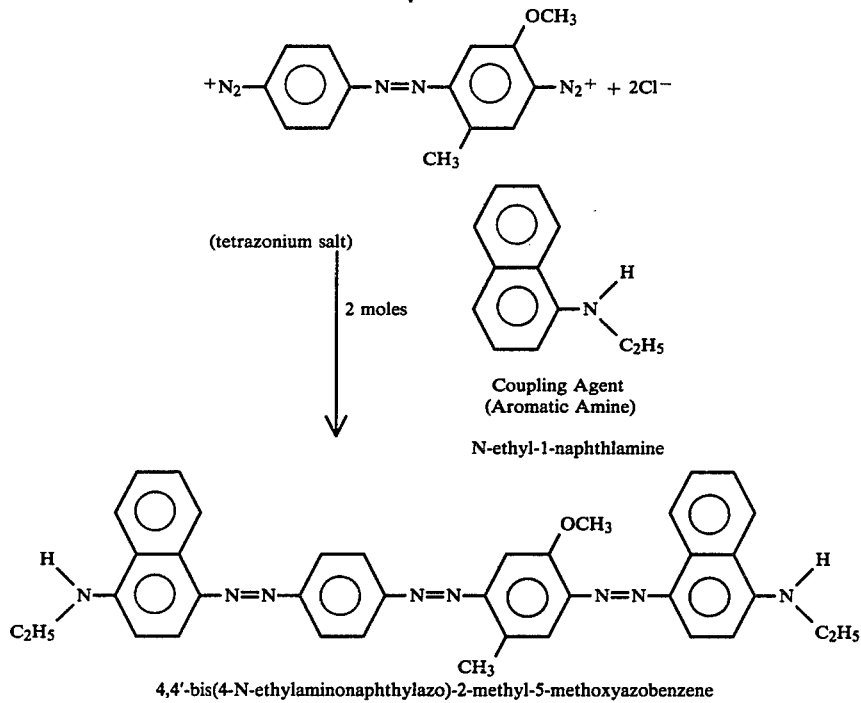

4,4′-diamino-2-methyl-5-methoxyazobenzene (tetrazonium salt)

Coupling Agent
(Aromatic Amine)

N-ethyl-1-naphthlamine 4,4′-bis(4-N-ethylaminonaphthylazo)-2-methyl-5-methoxyazobenzene In those cases where the terminal or end group on the dye molecule are hydroxy-substituted aromatic groups, such as, the phenols and the naphthols, in the foregoing reaction, a typical coupling agent would be 2-methylphenol, shown below:

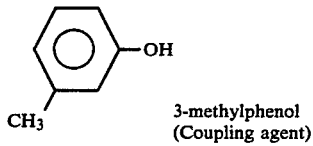

3-methylphenol
(Coupling agent)

or, 2-naphthol, shown below:

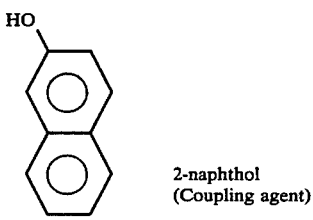

2-naphthol
(Coupling agent)

Other typical hydroxy-substituted aromatic compounds can be chosen by one skilled in the art. The coupling agents and substituted aromatic compounds are generally shown herein in the form of organic radicals.

In a more specific synthesis in accordance with the present invention, 4-4′-diamino-2-methyl-5-methoxyazobenzene, known commercially as Disperse Black B, is dissolved in dilute hydrochloric acid, and the solution is cooled, for example, to about 0°–5° C. A solution of sodium nitrite in water is added dropwise to the cooled hydrochloric acid solution. After stirring the mixture at the cooled temperature, e.g., about 0°–5° C. for about 2–4 hours, excess nitrous acid is destroyed by the addition of a suitable agent, e.g., urea. The resulting diazonium or tetrazonium salt is then filtered and added dropwise with stirring to a solution of the appropriate coupling agent, e.g., N-ethyl-1-naphthylamine, dissolved in acetic acid or other suitable solvent, and the reaction mixture is stirred for about 0.5–2.0 hours at a low temperature, e.g., about 5° C.–25° C. The dye is isolated by diluting the mixture with water, neutralizing with potassium carbonate, collecting the precipitate and recrystalizing the precipitate from pyridine or other suitable solvent. Naturally, other agents, solvents, neutralizers and recrystalization techniques can be substituted by one skilled in the art without undue experimentation. As discussed above, if both end groups (terminal groups) of the dye molecule have the same substituted aromatic or aryl group, then the tetrazonium salt is formed by using 2 moles or more of sodium nitrite per mole of starting material and reacting the tetrazonium salt with two moles of the corresponding coupling agent, e.g., aromatic amine. If only one terminal group on the dye molecule has a substituted aromatic or aryl group, then the diazonium salt is formed by using only about 1 mole of sodium nitrite per mole of starting material and reacting the diazonium salt with only about one mole of the substituted aromatic coupling agent per mole of the diazonium salt. If both end groups of the dye molecule have different substituted aromatic or aryl groups, then the diazonium salt is formed by using only about 1 mole of sodium nitrite per mole of starting material and reacting the diazonium salt with about 1 mole of the substituted aromatic coupling agent to form a molecule having one type of terminal group, thereafter forming the diazonium salt of the molecule having one type of terminal group by using 1 mole of sodium nitrite per mole of the molecule having one type of terminal group and reacting the diazonium salt thereof with about 1 mole of another substituted aromatic coupling agent.

In specific embodiments, the terminal groups, i.e., $R_1$ and/or $R_2$ of the general formula of the tris-azo dyes, are aromatic amines, substituted aromatic amines, hydroxy-substituted aromatic compounds and substituted hydroxy-substituted aromatic compounds. The general classes embracing the preferred embodiments are described above. The aromatic amines generally embrace those compounds wherein the benzene ring or the naphthalene ring has substituted thereon at least one nitrogen group which may be an amino ($-NH_2$) group or groups, or wherein the nitrogen substituted upon the benzene ring or naphthalene ring is substituted with one alkyl group, two alkyl groups, an arylalkyl group, an alkyl amine, or an aryl group, such as a phenyl group, or the nitrogen of the aromatic amine may be part of a saturated or unsaturated cyclic nitrogen-containing ring structure, e.g., piperazine, pyrazole, piperidine, or carbazole. The substituted aromatic amine may be any of the foregoing structures wherein the benzene ring or the naphthalene ring has substituted thereon, one or more alkyl groups, alkyl amine groups, alkoxy groups, halogen groups, hydroxy groups or a plurality of the foregoing or a mixture of the foregoing. Aminoquinoline, tetrahydroquinoline, julolidene are also aromatic amines or substituted aromatic amines as defined in accordance with the present invention.

In certain preferred embodiments, the terminal groups upon the dye molecule of the present invention are hydroxy-substituted benzene and hydroxy-substituted naphthalene and substituted derivatives thereof, including alkyl-substituted phenol and naphthol, amino-substituted phenol and naphthol, alkoxy-substituted phenol and naphthol, and halogen-substituted phenol and naphthol.

The most preferred aromatic amine terminal groups or end groups upon the tris-azo dyes of the present invention are those wherein at least one of the groups on the amino group, i.e., at least one of the atoms substituted upon the nitrogen of the amino group, is nonalkyl. For example, one or both groups on the amino group of the nitrogen group or groups of the aromatic amine may be hydrogen or phenyl, or the nitrogen of the aromatic amine may be part of a saturated or unsaturated cyclic nitrogen-containing ring structure, for example, piperazine, 3,5-dimethylpyrazole, piperidine, carbazole, and the like. As used herein, tetrahydroquinoline and aminoquinoline are aromatic amines and are included in the most preferred embodiments of the present invention. The most preferred embodiments of the present invention also include the hydroxy-substituted aromatic compounds discussed above. The most preferred embodiments of the present invention also include those substituted aromatic compounds wherein the aromatic or aryl portion of the molecule, i.e., benzene or naphthalene, is also substituted with alkyl, hydroxy, alkoxy, halogen and the like, and mixtures thereof and/or a plurality thereof.

Examples of terminal groups for the tris-azo dyes of the present invention, i.e., examples of $R_1$ and $R_2$ are shown in Table 1 below. Although the table illustrates dyes wherein $R_1$ and $R_2$ are the same, it is to be understood that any combination of $R_1$ and $R_2$ may be used in accordance with the present invention. The color of the dye and the name of the appropriate coupling agent used in the synthesis above with the tetrazotized 4,4'-diamino-2-methyl-5-methoxyazobenzene, are designated in Table 1 below. Dyes 1–4 in Table 1 were synthesized and used with a commercial liquid crystal host designated as Licristal 1132 to give the color designated in Table 1. Dyes 5–22 were synthesized and used with a commercial liquid crystal host designated as E-7 to give the color designated in Table 1. Licristal 1132 and E-7 are described below.

TABLE 1

EXAMPLES OF TRIS-AZO DYES OF THE PRESENT INVENTION

| DYE NO. | $R_1$ and $R_2$ | COUPLING AGENT | COLOR |
|---|---|---|---|
| 1.* | –⟨O⟩–N(H)(C₂H₅) | N-ethylaniline | Orange |
| 2.* | –⟨O⟩–N(H)(CH₃) | N-methylaniline | Orange |
| 3. | CH₃-substituted –⟨O⟩–N(CH₃)₂ | N,N-dimethylamino-m-toluidine | Violet-Blue |
| 4. | –⟨O⟩–N(CH₂CH₂CH₂CH₃)₂ | N,N-dibutylaniline | Wine-Red |
| 5. | –⟨O⟩(O)–N(CH₃)₂ (naphthyl) | N,N-dimethyl-1-naphthylamine | Violet |

TABLE 1-continued

EXAMPLES OF TRIS-AZO DYES OF THE PRESENT INVENTION

| DYE NO. | $R_1$ and $R_2$ | COUPLING AGENT | COLOR |
|---|---|---|---|
| 6. | —C₆H₄—N(CH₂CH₃)₂ (naphthyl) | N,N-diethyl-1-naphthylamine | Violet |
| 7.* | 2,4-dimethylaniline group (—C₆H₂(CH₃)₂—NH₂) | 2,5-dimethylaniline | Reddish-Violet |
| 8.* | —C₆H₃(CH₃)—OH | m-cresol | Orange |
| 9.* | —C₆H₄—N(piperidine) | N-phenylpiperidine | Wine Red |
| 10.* | —C₆H₄—N(piperazine)N—H | N-phenylpiperazine | Orange-Red |
| 11.* | —C₆H₄—N(3,5-dimethylpyrazole) | N-phenyl-3,5-dimethylpyrazole | Yellowish |
| 12.* | —(naphthyl)—NH—C₆H₅ | N-phenyl-1-naphthylamine | Bluish-Violet |
| 13. | —C₆H₄—N(CH₂CH₃)₂ | N,N-diethylaniline | Violet-Blue |
| 14.* | —C₆H₄—N(carbazole) | N-phenylcarbazole | Orange-Brown |
| 15.* | —C₆H₃(NH₂)-(tetrahydroquinoline) | 8-Aminoquinoline | Reddish-Violet |
| 16.* | —(naphthyl)(NH₂)(NH₂) | 1,8-diaminonaphthalene | Blue |

TABLE 1-continued
EXAMPLES OF TRIS-AZO DYES OF THE PRESENT INVENTION

| DYE NO. | $R_1$ and $R_2$ | COUPLING AGENT | COLOR |
| --- | --- | --- | --- |
| 17.* | (phenyl)-N-H with isopropyl/dimethyl substituents | Tetrahydroquinoline | Wine Red |
| 18.* | (phenyl)-N(H)(CH₂CH₂NH₂) — shown as phenyl-N with H and CH$_2$CH$_2$NH$_2$ | N-(1-naphthyl)-ethylenediamine | Purple |
| 19.* | (naphthyl)-OH | 2-Naphthol | Bluish |
| 20. | (phenyl with CH$_3$, CH$_3$)-N(CH$_3$)$_2$ | N,N,3,5-tetramethylaniline | Violet-Blue |
| 21. | (phenyl with CH$_3$)-N-(CH$_2$CH$_3$)$_2$ | N,N-diethylamino-m-toluidine | Purple |
| 22.* | (naphthyl)-N(H)(CH$_2$-CH$_3$) | N-ethyl-1-naphthylamine | Blue |

*Most preferred embodiments

Other coupling agents which can be used to prepare the tris-azo dyes from 4,4'-diamino-2-methyl-5-methoxyazobenzene in accordance with the present invention, and which can form $R_1$ and/or $R_2$ in the general formula representing the tris-azo dyes of the present invention, include julolidine, m-anisidine*, aniline*, 3-bromoaniline*, N-benzylaniline*, M-chloraniline*, N-ethyl-N-methylaniline, 3-bromo-N,N-dimethylaniline, N,N-diethyl-1-naphthylamine, N,N-diemthyl-3-aminophenol*, 3-chlorophenol* and 1-naphthol*. In the foregoing coupling agents, the "*" designates most preferred embodiments of the present invention wherein one or both of the terminal groups in the general formula of the tris-azo dyes of the present invention comprise the foregoing groups. Naturally, it is within the purview of one skilled in the art to add to a considerable number of coupling agents to the foregoing list to provide tris-azo dyes in accordance with the general formula of the present invention and which fall within the generic description of $R_1$ and/or $R_2$. As explained above, dyes of the general formula with different $R_1$ and $R_2$ groups can be synthesized by reacting the diazonium salt of 4,4'-diamino-2-methyl-5-methoxyazobenzene with about 1.0 mole of 1 type of coupling agent per mole of the diazonium salt followed by forming the diazonium salt of the produce thereof and reacting the diazonium salt of the product with about 1.0 mole of a different coupling agent.

For example, in a first reaction, the diazonium salt of 4,4'-diamino-2-methyl-5-methoxyazobenzene is added dropwise with stirring to a solution containing about 1.0 mole of N-ethyl-1-naphthylamine (dissolved in acetic acid) per mole of the diazonium salt. The reaction mixture is stirred for about 1 hour at about 10° C., and after neutralization a precipitate is formed. This provides a reaction product having one terminal end group of the aromatic amine. This product is diazotized with dilute hydrochloric acid and sodium nitrite to form a diazonium salt, and the diazonium salt is added dropwise with stirring to a solution of about 1.0 mole of N-phenylcarbazole dissolved in acetic acid, and the reaction mixture is stirred for about one hour at about 10° C. The dye having two different terminal groups is isolated by diluting the mixture with water, neutralizing with potassium carbonate, collecting the precipitate and recrystalizing the precipitate from pyridine.

The tris-azo dyes prepared in accordance with this invention can be used in any conventional manner. For example, they can be used alone or in combination with other dyes, modifiers or adjuvants to dye textiles (natural or man-made fibers) or to color plastic materials. The tris-azo dyes of this invention can be used alone or in combination with other dyes, modifiers or adjuvants to color liquid crystal displays. In preferred embodiments, the tris-azo dyes are used with liquid crystal host materials well-known in the art to improve the color of the liquid crystal composition for use in a liquid crystal display. When the tris-azo dyes of this invention are used with a liquid crystal host, they are called guest dyes, and they are dissolved in the host liquid crystal material, that is, the guest tris-azo dye is soluble in the host liquid crystal material. Many of the tris-azo dyes require mild heat, e.g., above ambient to 110° C. to promote their dissolution in the host liquid crystal.

Any liquid crystal host material may be used in accordance with the present invention. In those embodiments of the present invention wherein the tris-azo dichroic dye material is used as a guest dye in a host liquid crystal material it is not critical which of the many well known liquid crystal materials or combinations thereof may be used as long as the tris-azo dye materials of the present invention are soluble in the host liquid crystal material and as long as the tris-azo dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystal modified with other ptically active compounds.

Any conventional liquid crystal host material can be used with the tris-azo dyes of the present invention. The liquid crystal hosts can be selected by one skilled in the art depending upon the electro-optic effect to be utilized. Nematic liquid crystals include the bisphenyl liquid crystals such as E7 and E8 from BDH, Ltd.

Bisphenyl liquid crystal E-7 is a eutectic of the following general formula:

wherein R is a mixture of $C_5H_{11}$, $C_7H_{15}$, $C_8H_{17}O$ and

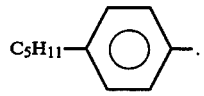

Other nematic liquid crystals include p-cyanophenyl p'-(p-alkyl)benzoate esters available from Merck Co. and Hoffman-LaRoche Co., phenylcyclohexanes and azoxy mixtures available from Merck Co., alkoxybenzylidene anils such as those having the structural formula:

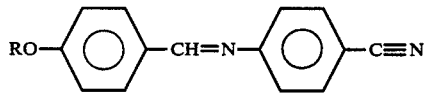

wherein OR is an alkoxy radical preferably having from 1 to 7 carbon atoms or an acyloxy radical having from 2 to 7 carbon atoms, p-anisylidene-p'-n-butylaniline, p-anisylidene-p'-aminophenyl-butyrate, p-(p'-methoxyphenylazoxy)butylbenzene, p-(p'-ethoxyphenylazo) phenylheptanoate, p-n-hexylbenzoic acid-p'-n-hexyloxyphenyl ester, and other liquid crystal materials, such as the esters disclosed in U.S. Pat. No. 3,984,344, p-n-hexylbenzylidene-p'-amino-benzonitrile, p-capryloxybenzylidene-p'-aminobenzonitrile, p-cyanophenyl-p'-n-heptylbenzoate, p- cyanobenzylidene-p'-n-butoxyaniline, p-cyanobenzylidene-p'-aminophenylvalerate, p-azoxyanisole, butyl-p-(p'-ethoxyphenoxycarbonyl)phenylcarbonate, p(p'-ethoxyphenylazo)phenylheptanoate, and the like. Another class of liquid crystal materials have the general formula:

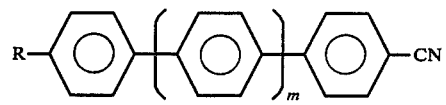

wherein R is an alkyl or alkoxy group and m=0 or 1, at least one of said compounds being cyanobiphenyl wherein m=0. Generally, nematic liquid crystals fall within the class of chemical compounds having the general formula:

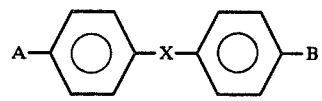

wherein X is an azomethine linkage of the Schiff base class, X is an ester, vinylene, acetylene, azo or azoxy, or X is merely a single bond connecting the two benzene rings; and A and B are $C_nH_{2n+1}$ (alkyl group); $C_nH_{2n+1}O$ (alkoxy group); or $C_nH_{2n+1}COO$ (ester group). Cholesteric liquid crystals can be pure compounds such as derivatives of cholesterol or noncholesteric materials. These are characterized by optical activity arising from the absence of molecular symmetry.

In accordance with the present invention, it is not critical how much of the dye is present in the host liquid crystal as long as the dye is soluble therein. In preferred embodiments, about 0.05% by weight to about 1.0% by weight, and more preferably greater than about 0.5% by weight, (based upon the weight of the liquid crystal host material) of the dye of this invention or mixtures of dyes of this invention are present in the host liquid crystal. One skilled in the art can adjust the amount of azo dye as desired and can determine the amount required for maximum absorption at a particular wavelength. The upper limit of the amount (concentration) of dye varies with the solubility of the particular dye in the host liquid crystal. The amount of guest dichroic tris-azo dye of the present invention in the host liquid crystal material is that amount up to the limit of maximum solubility in the host of tris-azo dye required to color, tint or shade the host liquid crystal, required to add to the color of the host liquid crystal material, or required to contribute to the color of a mixture of dyes used in the host liquid crystal material, e.g., the use of the tris-azo dye or dyes of this invention with dyes of other colors to improve the "blackness" of guest dyes in the host liquid crystal or to improve the intensity or contrast of any single color where more saturated colors are desired, especially for those dyes where the absorption band lies at longer wavelengths. As explained above, the bathochromic shift realized in the dyes of the present invention and resulting from the molecular structure of the dyes yields more saturated blue colors. The guest azo dichroic dyes of this invention are particularly useful in liquid crystal displays where more saturated blue colors are desired because the bathochromic shift for analogous prior art dyes (as in U.S. Pat. No. 4,122,027) is increased by as much as 10 nm where the molecular structure of the present invention is present in the tris-azo dye molecule.

As explained above, a particular advantage of the dyes of the present invention is that they tend to show a bathochromic shift with respect to the tris-azo dyes disclosed in the prior art, for example, those disclosed in U.S. Pat. No. 4,122,027 wherein there are no methyl and methoxy substituents in the 2- position and the 5-position of one of the benzene rings connected by the azo (-N=N-) linkage of the tris-azo dye molecule. Furthermore, as explained above, this bathochromic shift is particularly important for dyes whose absorption band lies at longer wavelengths because the shift in that wavelength region yields more saturated blue colors. For example, dye No. 16 in Table 1 above has a $\lambda$max (maximum light absorption) at about 615 nm whereas the corresponding prior art dye (dye No. 5 in column 3 of U.S. Pat. No. 4,122,027) only has a $\lambda$max of about 595 nm. Blue dye No. 22 in Table 1 above has a $\lambda$max of about 610 nm whereas the corresponding prior art dye without the methyl and methoxy groups substituted upon the benzene ring joined by two azo groups, (dye No. 3 in column 3 of U.S. Pat. No. 4,122,027) has a $\lambda$max of about 598 nm. In liquid crystal display technology, there are relatively few dyes which are soluble in liquid crystal host materials. Accordingly, there are few dichroic dyes having longer wavelengths, that is wavelengths in the blue region of the spectrum (600–700 nm) which are soluble in liquid crystal host materials. For this reason, it is important to provide dyes of longer wavelengths, especially those which yield more saturated blue colors, to improve blue liquid crystal displays and to improve the "blackness" of dichroic dye mixtures made from various colors. For example, the blue tris-azo dyes of this invention, when mixed with other appropriate dyes, for example, yellow azo dyes, in a liquid crystal, have improved "blackness". It is for this reason that the use of the blue dye or dyes of this invention with dyes of other colors improve the "blackness" of guest dyes in host liquid crystals. The guest blue tris-azo dichroic dyes of this invention are particularly useful in black liquid crystal displays because improved black liquid crystal materials can be obtained by mixing dichroic dyes of various colors in proper proportions to obtain a material which absorbs radiation in the spectral range of about 400–700 nm, and the blue tris-azo dyes of this invention substantially improve the absorption in the region above 600 nm of such dye mixtures, for example, as discussed above, in accordance with the present invention, blue dyes having maximum absorption ($\lambda$max) of about 610 and 615 are possible with the dyes of the present invention. Naturally, liquid crystal displays containing dichroic dyes of the other colors of the present invention can also be used in the dichroic dye mixtures and can be used as guest dyes for black liquid crystal materials or various other colors of liquid crystal materials. Thus, in accordance with the present invention, the method of making black dichroic dyes or black dichroic liquid crystal displays is achieved by providing a host liquid crystal material and mixing therewith dichroic dyes of various colors in suitable proportions to obtain a material which absorbs radiation in the spectral range of about 400–700 nm wherein the dichroic dyes of various colors include at least one blue dye having the general formula described above for the tris-azo dyes of the present invention and having maximum (peak) absorption greater than about 600 nm. Examples of such blue dyes are those tris-azo dyes of the present invention wherein $R_1$ and $R_2$ are N-ethyl-1-naphthyamine, 1,8-diaminonaphthalene, 2-naphthol, N-benzylnaphthylamine and the like. The appropriate mixture of dichroic dyes of various colors in suitable proportions to obtain a material which absorbs radiation in the spectral range of about 400–700 nm, and which approaches a substantially black appearance in color, is within the purview of one skilled in the art, and the improvement of the present invention is directed to the use of one or more of the blue tris-azo dyes having a maximum or peak absorption greater than about 600 nm to improve the "blackness" of the dichroic dye mixture made from various colors. For example, the blue azo dyes of this invention, when mixed with appropriate yellow azo dyes in a liquid crystal, produce an improved bluish-black display. When about 1% by weight of the blue azo dye of this invention is used with about 0.5% to about 10% yellow dye or dyes, the greenish-black or bluish-black displays are substantially improved in a biphenyl liquid crystal. The blue tris-azo dyes of this invention used in such mixtures, have substantially high order parameters (S) generally at least 0.70 and above, to insure satisfactory brightness and contrast ratio.

In accordance with the present invention, it has also been discovered that, in general, the tris-azo dyes having substituted aromatic terminal groups, e.g., aromatic amines, substituted aromatic amines, phenols, naphthols, substituted phenols and substituted naphthols, have increased solubility over the prior art dyes of U.S. Pat. No. 4,122,027. It has been found that generally, in accordance with the present invention, the methyl group in the 2-position and the methoxy-group in the 5-position on one of the benzene rings joined by two azo groups in the dye molecule increases the solubility of the dye having the general formula described above for the present invention and having terminal groups of substituted aromatic groups, such as aromatic amines, substituted aromatic amines, phenols, naphthols, substituted phenols, and substituted naphthols, and the like. In certain cases, for example, in dye No. 22 in Table 1 above, it has been discovered that the tris-azo dyes of the present invention having the methyl group substituted in the 2-position and the methoxy group substituted in the 5-position of one of the benzene rings of the general formula of the dyes of this invention, increases the solubility of the dye between 2 and 3 times that of the analogous tris-azo dye without the methyl and methoxy groups substituted upon one of the benzene rings of the dye molecule.

The following specific examples describe the tris-azo dyes and the liquid crystal displays of the present invention. They are intended for illustrative purposes only and should not be construed as a limitation.

EXAMPLE I

Dye No. 22 in Table 1 above, was synthesized by tetrazotizing 4,4'-diamino-2-methyl-5-methoxyazobenzene and coupling the tetrazonium salt formed thereby with the appropriate aromatic amine to form the tris-azo dye. 4,4'-diamino-2-methyl-5-methoxyazobenzene (2.56 grams, 10 millimoles) was dissolved in 60 ml of 9% hydrochloric acid, and the solution was cooled to about 0°–5° C. A solution of sodium nitrite (1.5 gram, 22 millimoles) in 5.0 ml of water was added dropwise to the starting material. After stirring the mixture at 0°–5° C.

for about 3 hours after the addition of the sodium nitrite, excess nitrous acid formed from the reaction, was destroyed with urea. The resulting tetrazonium salt was then filtered and added dropwise with stirring to a solution of n-ethyl-1-naphthylamine (3.4 grams, 20 millimoles) dissolved in 50 ml of acetic acid at about 10° C.; and the reaction mixture was stirred for about 1 hour at about 10° C. The dye was isolated by diluting the mixture with water, neutralizing with potassium carbonate, collecting the precipitate and recrystalizing the precipitate from pyridine. The dye having the characteristics enumerated in Table 1 above and having a λmax of about 610 nm was produced by this synthesis.

EXAMPLE II

The other dyes in Table 1 above were prepared in accordance with the procedure and reaction conditions set forth in Example I above, from the same tetrazonium salt by allowing the salt to react with the appropriate aromatic compound, e.g., aromatic amine, substituted aromatic amine, phenol, substituted phenol, naphthol, substituted naphthol and the like. The appropriate aromatic group used in place of the N-ethyl-1-naphthylamine of Example I above was used in the reaction. These aromatic compounds which were reacted with the tetrazonium salts, are described in Table 1 above for each of the respective dyes numbered 1 through 22. The characteristic colors of the dyes in the specified liquid crystal host material are described in Table 1.

EXAMPLE III

In one type of liquid crystal display, the blue tris-azo dye, dye No. 22 in Table 1 above prepared in accordance with the technique set forth in Example I above, was dissolved at a concentration of about 0.5% in nematic liquid crystal E-7 obtained from E. Merck Associates. The composition of nematic liquid crystal E-7 was described above. The blue dye, 4,4′-bis-(4-N-ethylaminonaphthylazo)-2-methyl-5-methoxyazobenzene was heated to 90° C. to dissolve the dye in the liquid crystal E-7, and the material was filtered. The liquid was placed in a test cell between glass plates whose surfaces in contact with the solution had been previously rubbed unidirectionally. The test cell was a conventional liquid crystal cell having a distance of 12 microns between the glass plates. The cell was filled with the above dichroic liquid crystal composition. The resulting cell had a blue color when illuminated with properly oriented polarized light in the absence of a voltage. The blue color substantially disappeared upon the application of a voltage of about 15 volts.

EXAMPLE IV

A liquid crystal test cell similar to the one described in Example III above was prepared and filled with the blue dye (dye No. 22 in Table 1 above), i.e., 4,4′-bis(4-N-ethylaminonaphthylazo)-2-methyl-5-methoxyazobenzene was dissolved in two other nematic liquid crystal hosts. The nematic liquid crystal hosts were ROTN-404 supplied by Hoffman-LaRoche Company and Licristal 1132, supplied by E. Merck Associates. ROTN-404 liquid crystal is a biphenyl-pyrimidine of positive dielectric anisotropy having a temperature range of −10° C. to 105° C., and Licristal 1132 is a phenylcyclohexane having a dielectric anisotropy of 10 and a temperature range of −6° to 70° C. Results similar to those described in Example III above were obtained upon the application of voltage.

EXAMPLE V

In another type of liquid crystal display, incorporating a cholesteric liquid crystal host material, 0.5% by weight of blue dye 4,4′-bis(4-N-ethylaminonaphthylazo)-2-methyl-5-methoxyazobenzene was dissolved in a cholesteric host material comprising about 2.5–7.5% by weight of an optically active compound CB-15, supplied by E. Merck Associates, in ROTN-404. CB-15 is an optically active chiral dopant, 4-cyano-4′-(2-methyl)butylbiphenyl having the formula:

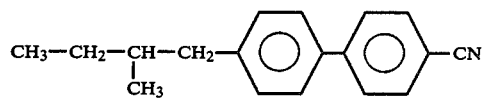

ROTN-404 is described in Example IV above. The blue dye (dye No. 22 in Table 1 above) was dissolved in the host by heating as described in Example III above, and the solution was filtered to remove residual solids. A test cell comprising 2 glass plates as described in Example III above was filled with the liquid crystal host material containing the blue dye dissolved therein. The cell was blue in the absence of a voltage and colorless upon the application of a voltage when viewed in unpolarized light.

The utility of the tris-azo dyes of this invention has been demonstrated. When used alone, the dyes can be used to provide colored liquid crystal displays, or they can be used as additives in conjunction with other dyes to provide various colored dyes in liquid crystal displays, or to provide improved black dyes for black dichroic displays when used with liquid crystals. The dyes of the present invention can also be used as additives with other dyes to obtain unusual color effects in liquid crystal displays. Furthermore, the tris-azo dyes of the present invention have been shown to be useful with a wide variety of liquid crystal compositions and are compatible with known liquid crystals, such as Schiff base, esters, azoxy, biphenyl, phenylcyclohexanes, biphenyl/pyrimidine-type liquid crystals and the like. The novel tris-azo dyes of the present invention can also be used for the dyeing of textiles, coloring of plastics or the coloring of any other media conventionally colored by azo dyes.

While other modifications of the invention and variations thereof which may be employed within the scope of the invention have not been described, the invention is intended to include such modifications as may be embraced within the following claims.

What is claimed is:

1. A liquid crystal composition for use in a liquid crystal display, comprising a host liquid crystal material and a guest dichroic dye dissolved in said liquid crystal material, said dichroic dye having the formula,

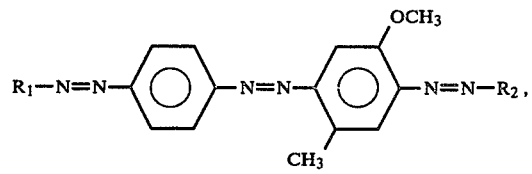

where $R_1$ and $R_2$ are selected from naphthalamine groups having the formula,

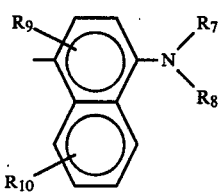

$R_7$ is selected from the class consisting of hydrogen, $C_{(1-6)}$ alkyl, aryl, arylalkyl and a $C_{(1-6)}$ alkyl amine radical, $R_8$ is selected from the class consisting of hydrogen, $C_{(1-6)}$ alkyl, and a $C_{(1-6)}$ alkyl amine radical, $R_9$ and $R_{10}$ are selected from the class consisting of hydrogen, $C_{(1-3)}$ alkyl, alkoxy and halogen.

2. The liquid crystal composition of claim 1, wherein $R_7$ is selected from the group consisting of hydrogen, methyl and ethyl, and $R_8$ is selected from the group consisting of methyl, ethyl, phenyl and ethylamine.

3. The liquid crystal composition of claim 1, wherein $R_1 = R_2$.

4. The liquid crystal composition of claim 1, wherein about 0.05% by weight to about 1.0% by weight (based upon the weight of the liquid crystal) of dichroic dye is dissolved in the host liquid crystal.

5. The liquid crystal composition of claim 1, wherein the host material is a nematic liquid crystal of positive or negative dielectric anisotropy, a cholesteric liquid crystal of positive or negative dielectric anisotropy and mixtures of any of the foregoing modified with other optically active compounds.

6. The liquid crystal composition of claim 1, wherein $R_1$ and $R_2$ of the guest dichroic dye are selected from the group consisting of N-phenylnaphthylamine; N-(1-naphthyl)ethylenediamine; N-ethyl-1-naphthylamine; and N-methyl-1-naphthylamine.

7. A tris-azo dye having the formula,

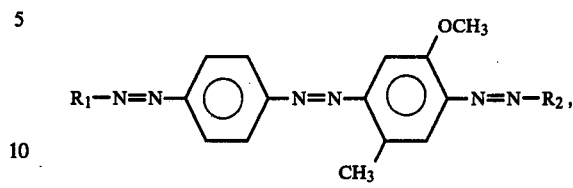

where $R_1$ and $R_2$ are selected from an aromatic amine group having the formula,

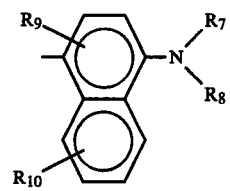

$R_7$ is selected from the class consisting of hydrogen, $C_{(1-6)}$ alkyl, aryl, arylalkyl and a $C_{(1-6)}$ alkyl amine radical, $R_8$ is selected from the class consisting of hydrogen, $C_{(1-6)}$ alkyl, and a $C_{(1-6)}$ alkyl amine radical and $R_9$ and $R_{10}$ are selected from the class consisting of hydrogen, $C_{(1-3)}$ alkyl, alkoxy and halogen.

8. The dye composition of claim 7, wherein $R_7$ is selected from the group consisting of hydrogen, methyl and ethyl, and $R_8$ is selected from the group consisting of methyl, ethyl, phenyl and ethylamine.

9. The dye composition of claim 7, wherein $R_1 = R_2$.

10. The dye composition of claim 7, wherein $R_1$ and $R_2$ of the general formula are selected from the group consisting of N-ethyl-1-naphthylamine; N-methyl-1-naphthylamine; N-phenyl-1-naphthylamine; and N-(1-naphthyl)ethylenediamine.

* * * * *